United States Patent
Garg et al.

(10) Patent No.: US 8,373,425 B2
(45) Date of Patent: Feb. 12, 2013

(54) PLASMA INSENSITIVE HEIGHT SENSING

(75) Inventors: Sanjay Garg, Hanover, NH (US);
William J. Connally, Grantham, NH (US)

(73) Assignee: Hypertherm, Inc., Hanover, NH (US)

( * ) Notice: Subject to any disclaimer, the term of this patent is extended or adjusted under 35 U.S.C. 154(b) by 459 days.

(21) Appl. No.: 12/593,228

(22) PCT Filed: Apr. 4, 2008

(86) PCT No.: PCT/US2008/059444
§ 371 (c)(1),
(2), (4) Date: Sep. 25, 2009

(87) PCT Pub. No.: WO2008/124615
PCT Pub. Date: Oct. 16, 2008

(65) Prior Publication Data
US 2010/0109681 A1 May 6, 2010

Related U.S. Application Data

(63) Continuation-in-part of application No. 11/697,599, filed on Apr. 6, 2007, now Pat. No. 8,244,494.

(51) Int. Cl.
*G01R 27/26* (2006.01)
(52) U.S. Cl. .............. 324/662; 219/121.54; 219/121.57; 219/121.84; 118/723 E; 324/716
(58) Field of Classification Search .................. 324/662
See application file for complete search history.

(56) References Cited

U.S. PATENT DOCUMENTS

| | | | | |
|---|---|---|---|---|
| 4,220,927 | A * | 9/1980 | Austin | 327/140 |
| 5,218,311 | A | 6/1993 | Jagiella et al. | 324/683 |
| 5,532,583 | A * | 7/1996 | Davis et al. | 324/202 |
| 5,674,415 | A * | 10/1997 | Leong et al. | 219/121.83 |
| 5,698,120 | A | 12/1997 | Kurosawa et al. | 219/121.62 |
| 6,054,866 | A | 4/2000 | Mansfield | 324/635 |
| 6,150,826 | A * | 11/2000 | Hokodate et al. | 324/662 |
| 6,445,191 | B1 | 9/2002 | Trummer | 324/635 |
| 6,509,744 | B1 * | 1/2003 | Biermann et al. | 324/662 |
| 6,863,018 | B2 * | 3/2005 | Koizumi et al. | 118/723 E |
| 7,335,851 | B2 * | 2/2008 | Iwata et al. | 219/121.54 |
| 7,411,152 | B2 | 8/2008 | Yamazaki et al. | 219/121.83 |
| 7,605,595 | B2 * | 10/2009 | May | 324/716 |
| 2001/0052768 | A1 * | 12/2001 | Demma et al. | 324/200 |
| 2004/0135590 | A1 * | 7/2004 | Quon | 324/713 |
| 2006/0070983 | A1 | 4/2006 | Narayanan et al. | 219/130.51 |
| 2006/0289408 | A1 * | 12/2006 | Iwata et al. | 219/121.54 |
| 2007/0284348 | A1 * | 12/2007 | Iwata et al. | 219/124.02 |
| 2008/0083714 | A1 * | 4/2008 | Kamath et al. | 219/121.57 |

FOREIGN PATENT DOCUMENTS

| | | |
|---|---|---|
| DE | 40 20 196 | 1/1992 |
| DE | 43 11 064 | 10/1994 |
| DE | 43 40 395 | 12/1994 |
| DE | 4340395 | 12/1994 |

(Continued)

*Primary Examiner* — Timothy J Dole
*Assistant Examiner* — Benjamin M Baldridge
(74) *Attorney, Agent, or Firm* — Proskauer Rose LLP

(57) ABSTRACT

A method for determining a distance between a first piece and a second piece includes measuring, at the first or second piece, an AC signal, and determining the distance based on the measured AC signal. A system for determining a distance between a first piece and a second piece includes a measuring device adapted to measure, at one or both of the first and second piece, an AC signal, and a signal processing device adapted to determine the distance based on the measured AC signal. The AC signal includes a DC offset.

25 Claims, 9 Drawing Sheets

FOREIGN PATENT DOCUMENTS

| | | |
|---|---|---|
| DE | 198 47 365 | 5/2000 |
| DE | 19847365 | 5/2000 |
| EP | 1 684 046 | 7/2006 |
| EP | 1684046 | 7/2006 |
| JP | 04 356391 | 12/1992 |
| WO | WO 94/23286 | 10/1994 |

* cited by examiner

PLASMA INSENSITIVE HEIGHT SENSING

RELATED APPLICATIONS

This application is a national stage of, and claims priority to, PCT International Application Ser. No. PCT/US08/59444, filed on Apr. 4, 2008, which is a continuation-in-part of, and claims priority to, U.S. patent application Ser. No. 11/697,599, filed on Apr. 6, 2007, the contents of each of which are incorporated herein by reference in their entirety.

FIELD OF THE INVENTION

The present technology relates generally to a method and apparatus for determining a distance between a first piece and a second piece that is insensitive to the presence of a plasma or other electrically conductive substance between the two pieces.

BACKGROUND

Thermal processing systems, such as laser and plasma arc systems, are widely used in the cutting, welding, heat treating, and processing of metallic materials. A laser-based apparatus generally includes a nozzle through which a gas stream and laser beam pass to interact with a workpiece. Both the beam and the gas stream exit the nozzle through an orifice and impinge on a target area of the workpiece. The laser beam heats the workpiece. The resulting heating of the workpiece, combined with any chemical reaction between the gas and workpiece material, serves to heat, liquefy and/or vaporize a selected area of workpiece, depending on the focal point and energy level of the beam. This action allows the operator to cut or otherwise modify the workpiece.

In general, a thermal processing system can include a laser-based or plasma-based torch, an associated power supply, a gas console, a positioning apparatus, a cutting table, a torch height control, and an associated computerized numeric controller (CNC).

In operation, a user places a workpiece on the cutting table and mounts the torch on the positioning apparatus, which provides relative motion between the tip of the torch and the workpiece to direct the laser beam or the plasma arc along a processing path. The CNC accurately directs motion of the torch and/or the cutting table to enable the workpiece to be cut to a desired pattern. Position information is returned from the positioning apparatus to the CNC to allow the CNC to operate interactively with the positioning apparatus to obtain an accurate cut path.

A torch height control module sets the height of the torch relative to the workpiece. A lifter, which is controlled by the torch height control module through a motor, moves the torch in a vertical direction relative to the workpiece to maintain a desired processing quality during cutting for a particular application. Typically, capacitive height sensing (CHS) is used to measure the distance between the torch and the workpiece during machining. In a typical implementation of CHS, a single sinusoidal electrical signal is applied to the torch and the capacitive impedance between the torch and the workpiece is measured to derive the distance. CHS models the electrical circuit between the torch and the workpiece as a single capacitor. As a result, CHS does not provide for accurate distance measurements in situations where a plasma or other electrically conductive substance forms or is present between the torch and the workpiece.

SUMMARY OF THE INVENTION

What is needed is a distance measurement that is insensitive to the presence of a plasma between a first and a second piece. One approach to determining a distance between a first piece and a second piece is to perform measurements at two different frequencies. In one aspect, there is a method for determining a distance between a first piece and a second piece. The method includes measuring, at the first or second piece, an AC signal. The AC signal includes a DC offset. The method further includes determining the distance based on the measured AC signal.

In another aspect, there is a system capable of determining a distance between a first piece and a second piece. The system includes a measuring device adapted to measure, at one or both of the first and second piece, an AC signal. The AC signal includes a DC offset. The system further includes a signal processing device adapted to determine the distance based on the measured AC signal. In some embodiments, the system can further include a first band-pass filter adapted to attenuate the DC offset. The system can further include a second band-pass filter adapted to pass the DC offset. The system can further include a source adapted to apply, at the first or second piece, a source AC signal. The source AC signal can include a source DC offset. The measuring device can be adapted to measure the AC signal at a position after a known electrical element. The known electrical element can be located between the position and the source. The system can further include a switched-signal generator adapted to generate the source AC signal by switching between two or more voltage levels. The switched-signal generator can include a switch coupled to two voltage levels. The system can further include a source band-pass filter adapted to pass the source AC signal from the switched-signal generator to the source. The source band-pass filter can include a cut-off frequency above a fundamental harmonic of the source AC signal.

In another aspect, there is a system capable of determining a distance between a first piece and a second piece. The system includes measuring means for measuring, at the first or second piece, an AC signal. The AC signal includes a DC offset. The system further includes signal processing means for determining the distance based on the measured AC signal. In some embodiments, the system can further include high-pass filtering means for attenuating the DC offset. The system can further include low-pass filtering means for passing the DC offset. The system can further include source means for applying, at the first or second piece, a source AC signal. The source AC signal can include a source DC offset.

In other examples, any of the aspects above can include one or more of the following features. In some embodiments, the first piece can include a torch component and the second piece can include a workpiece. The torch component can include a laser nozzle. Determining the distance can include calculating a gap capacitance between the first piece and the second piece based on the measured AC signal, and determining the distance based on the gap capacitance. Determining the gap capacitance can be based on: a frequency of the AC signal, a magnitude of the AC signal, a magnitude of the DC offset, or any combination thereof. Determining the distance can include using a calibration data set to determine the distance. The calibration data set can include data values associated with: the frequency of the AC signal, a magnitude of the AC signal, a magnitude of the DC offset, or any combination thereof. The AC signal can include: a current signal or a voltage signal. Measuring the AC signal can include passing the AC signal through a high band-pass filter. The high band-pass filter can attenuate the DC offset. Measuring the AC signal can further include passing the AC signal through a low band-pass filter. The method can further include determining a plasma resistance between the first piece and the second piece based on the measured AC signal. The method can further include applying, at the first or second piece, a source AC signal. The source AC signal can include a source DC offset. The source AC signal can include: a current source signal or a voltage source signal. The method can further include generating the source AC signal by switching between two or more voltage levels. The source AC signal can be a square wave. The method can further include passing the source AC signal through a source band-pass filter before applying the source AC signal to the first or second piece. The source band-pass filter can include a cut-off frequency above a fundamental harmonic of the source AC signal. The step of determining the distance can include using a calibration data set to determine the distance. The calibration data set can include data values associated with: a frequency of the AC signal, a magnitude of the AC signal, a magnitude of the DC offset, a magnitude of the source AC signal, a magnitude of the source DC offset, or any combination thereof. Measuring the AC signal can include measuring the AC signal at a position after a known electrical element. The known electrical element can be located between the position and a source of the source AC signal.

Any of the above implementations can realize one or more of the following advantages. Performing measurements at two different frequencies allows for distance measurements independent of the presence of a plasma. In addition, the insensitivity of the distance measurement to plasma or other conductive elements allows for accurate height determination of a component in real time. Moreover, the insensitivity of the distance measurement to plasma or other conductive elements allows for height determination of a component while an operation is being carried out using the component (e.g., thermal processing).

Other aspects, examples, and advantages of the present invention will become apparent from the following detailed description, taken in conjunction with the accompanying drawings, illustrating the principles of the invention by way of example only.

BRIEF DESCRIPTION OF THE DRAWINGS

The foregoing and other features and advantages of the present invention, as well as the invention itself, will be more fully understood from the following description of various embodiments, when read together with the accompanying drawings.

DETAILED DESCRIPTION

Figure 1:
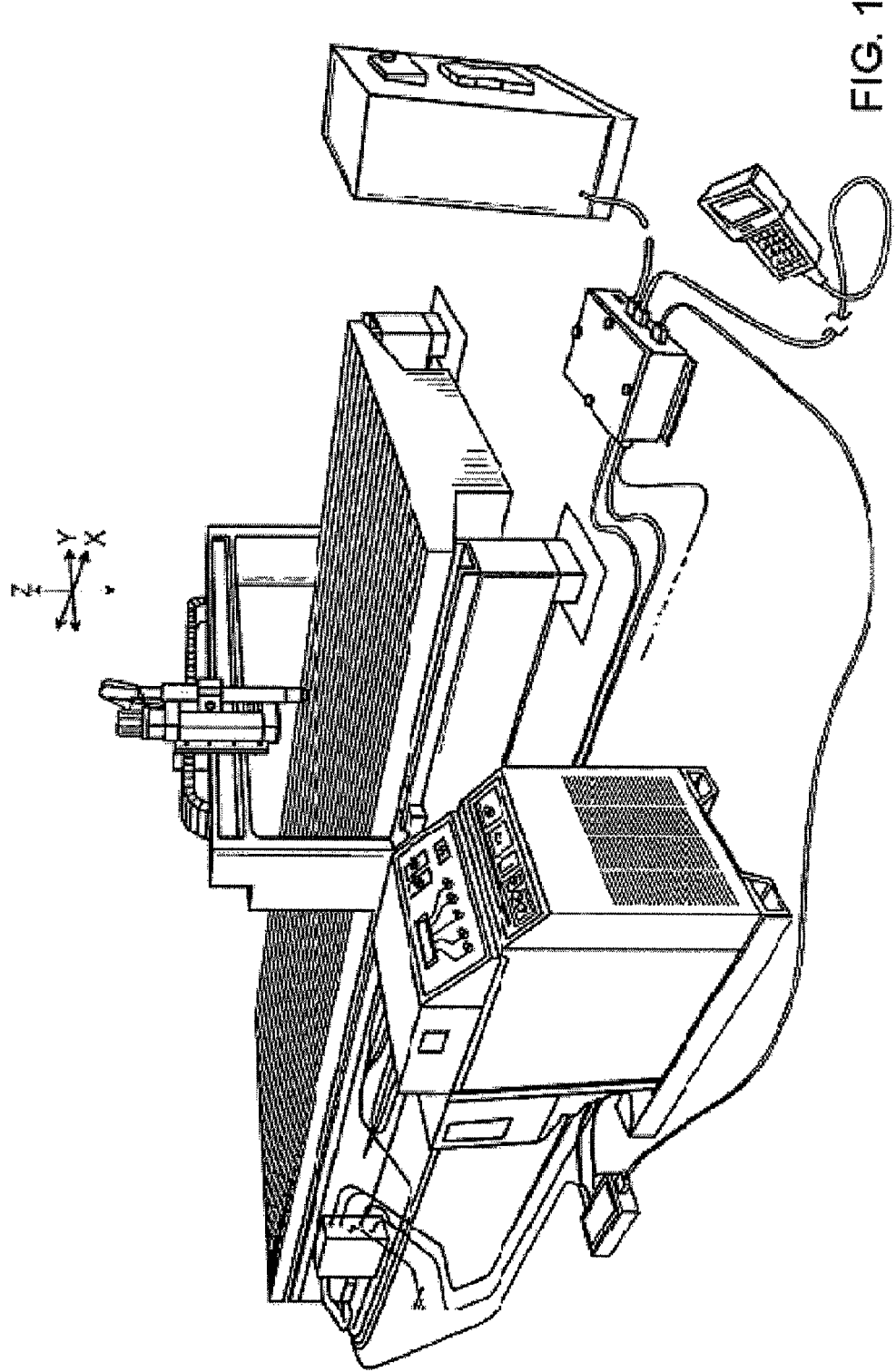
FIG. 1 is a schematic diagram of a thermal processing system.

Capacitive height sensing (CHS) can be used to determine the distance between two pieces that exhibit measurable capacitance between them, due to the dependence that capacitance has on the distance. In one embodiment, the distance can be calculated based on a value of capacitance (e.g., based on first principles, such as distance=area×permittivity/capacitance for the simplified case of a parallel plate capacitor). In another embodiment, the distance can be correlated with a value of capacitance (e.g., using a calibrated table for more complicated geometries). In a thermal processing system, as illustrated in FIG. 1, the two pieces can be a torch component and a workpiece. CHS distance measurements in such a system can provide feedback during the operation. Therefore, the distance between the torch and the workpiece can be accurately set depending on the particular application. In general, however, CHS measurements can be used to determine the distance between any two pieces that exhibit capacitance between them.

Figure 2:
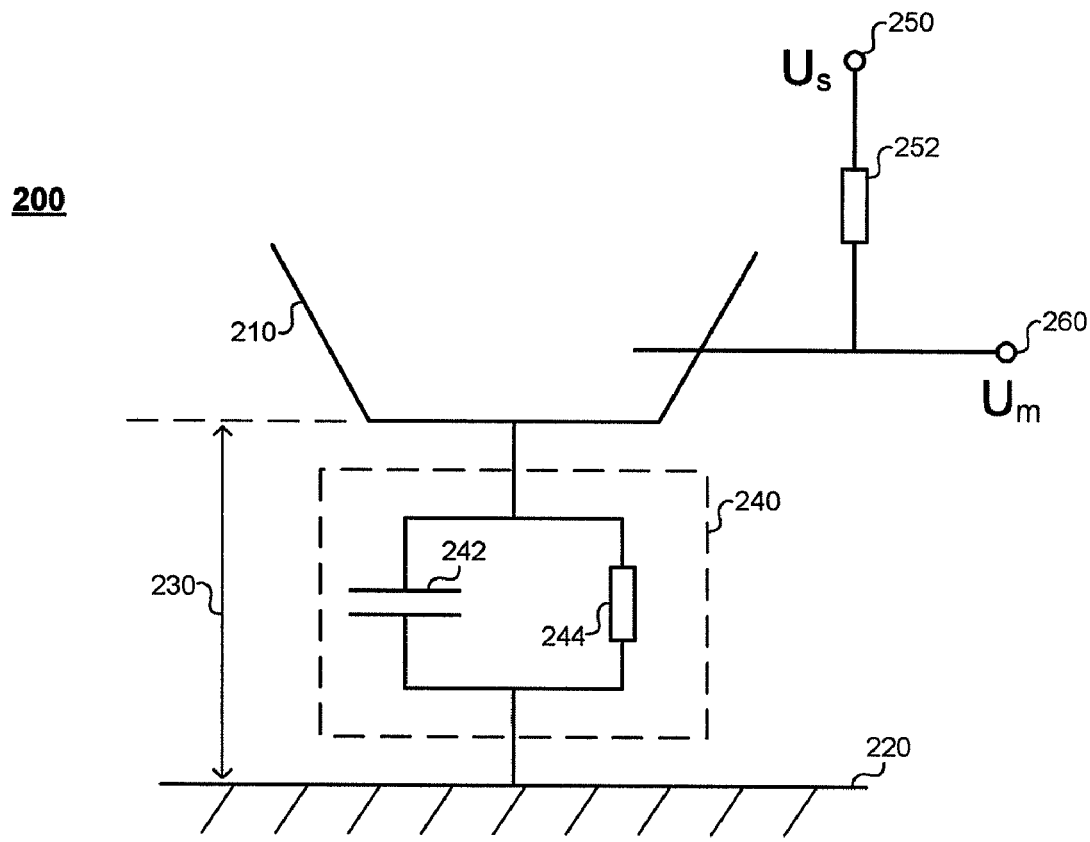
FIG. 2 is a model diagram illustrating the electrical circuit between a torch component and a workpiece.

FIG. 2 is a model diagram 200 illustrating the electrical circuit between a torch component 210 and a workpiece 220. The torch component 210 can be, for example, a torch head or a nozzle of a laser-based or plasma-based torch. The torch component 210 is separated from the workpiece 220 by a distance 230. In applications where a plasma or other electrically conductive substance (e.g., metal vapor such as when cutting galvanized metal) forms or is present between the torch component 210 and the workpiece 220, the electrical impedance between the torch component 210 and the workpiece 220 can be modeled as a gap impedance $Z_g$ 240, which is the combination of a gap capacitance $C_g$ 242 in parallel with a plasma resistance $R_p$ 244. The gap capacitance $C_g$ 242 can be due to the geometrical properties of the torch component 210 and the workpiece 220, and the capacitive properties of the material between them, which can be a non-conductive gas. The plasma resistance $R_p$ 244 can be due to the presence of a plasma and/or other electrically-conductive substance between the torch component 210 and the workpiece 220. The gap impedance $Z_g$ 240 can be given by:

$$Z_g = C_g // R_p = \frac{R_p}{1 + j\omega C_g R_p}, \tag{1}$$

where $j=\sqrt{-1}$ and $\omega=2\pi f$ (is the radian frequency at which the gap impedance $Z_g$ 240 is measured. A sinusoidal source (not pictured) can be used to supply a source signal $U_s$ 250 to the torch component 210. The source signal $U_s$ 250 can be provided, for example, by a voltage source or a current source. The source signal $U_s$ 250 can be generated by, for example, one or more oscillators operating at one or more different frequencies. A known reference resistance $R_{ref}$ 252 can be included between the sinusoidal source of $U_s$ 250 and the torch component 210.

A signal $U_m$ 260 can be measured at the torch component 210. Using the voltage divider rule, the measured signal $U_m$ 260 can be represented as:

$$U_m = U_s \left( \frac{Z_g}{Z_g + R_{ref}} \right) = U_s \left( \frac{1}{1 + R_{ref}/R_p + j\omega C_g R_{ref}} \right). \quad (2)$$

From equation (2), the magnitude of the measured signal $U_m$ 260 can be represented as:

$$|U_m| = \frac{|U_s|}{\sqrt{(1 + R_{ref}/R_p)^2 + (\omega C_g R_{ref})^2}}. \quad (3)$$

The magnitude of the measured signal $U_m$ 260 can be determined using, for example, a true-RMS meter, an application-specific integrated circuit (ASIC), a peak-detection circuit, or other signal measurement device. The magnitude of the measured signal $U_m$ 260 can be a peak amplitude, a peak-to-peak amplitude, an RMS amplitude, or another amplitude of the measured signal $U_m$ 260.

Equation (3) includes two unknowns: the gap capacitance $C_g$ 242 and the plasma resistance $R_p$ 244. By measuring the magnitude of the measured signal $U_m$ 260 at two different frequencies, the gap capacitance $C_g$ 242 and/or the plasma resistance $R_p$ 244 can be solved for from the two resulting equations:

$$\frac{|U_{s,\omega_1}|^2}{|U_{m,\omega_1}|^2} = \left(1 + \frac{R_{ref}}{R_p}\right)^2 + (\omega_1 C_g R_{ref})^2, \quad (4)$$

$$\frac{|U_{s,\omega_2}|^2}{|U_{m,\omega_2}|^2} = \left(1 + \frac{R_{ref}}{R_p}\right)^2 + (\omega_2 C_g R_{ref})^2. \quad (5)$$

Subtracting equation (5) from equation (4) yields:

$$\frac{|U_{s,\omega_1}|^2}{|U_{m,\omega_1}|^2} - \frac{|U_{s,\omega_2}|^2}{|U_{m,\omega_2}|^2} = (\omega_1^2 - \omega_2^2)(C_g R_{ref})^2, \quad (6)$$

which is independent of the plasma resistance $R_p$ 244. From equation (6), the gap capacitance $C_g$ 242 can be found to be a function of the known frequencies ($\omega_1$, $\omega_2$), the magnitudes of the measured signals 260 ($|U_{m,\omega_1}|,|U_{m,\omega_2}|$), the magnitudes of the source signals 250 ($|U_{s,\omega_1}|,|U_{s,\omega_2}|$), and the known reference resistance 252 $R_{ref}$:

$$C_g = \frac{1}{R_{ref}} \sqrt{\frac{1}{(\omega_1^2 - \omega_2^2)} \left( \frac{|U_{s,\omega_1}|^2}{|U_{m,\omega_1}|^2} - \frac{|U_{s,\omega_2}|^2}{|U_{m,\omega_2}|^2} \right)}. \quad (7)$$

Equation (7) can be simplified in cases where $\omega_2 \ll \omega_1$ (e.g., where $\omega_2=0$) as:

$$C_g = \frac{1}{\omega_1 R_{ref}} \sqrt{\left( \frac{|U_{s,\omega_1}|^2}{|U_{m,\omega_1}|^2} - \frac{|U_{s,\omega_2}|^2}{|U_{m,\omega_2}|^2} \right)}. \quad (8)$$

In the DC case (where $\omega_2=0$), the source signal $U_s$ 250 can be a sinusoid with a DC offset, wherein the measured signal will also be a sinusoid with a DC offset. The plasma resistance $R_p$ 244 can be solved for in a similar fashion using equations (4) and (5). In an alternative embodiment, in DC situations or where the source signal 250 is a sinusoid with a DC offset, the plasma resistance $R_p$ 244 can be solved for directly. From equation (2), where $\omega=0$, the plasma resistance $R_p$ 244 can be solved as:

$$R_p = R_{ref} \frac{U_{m,\omega=0}}{U_{s,\omega=0} - U_{m,\omega=0}}, \quad (9)$$

where $U_{s,\omega=0}$ is the DC offset of the source signal and $U_{m,\omega=0}$ is the DC offset of the measured signal. From equation (9), the unknown plasma resistance $R_p$ 244 can be determined in terms of the DC offsets of the source and measured signals.

The source signal $U_s$ 250 and the measured signal $U_m$ 260 can each be measured with respect to the workpiece 220 (e.g., the workpiece 220 can operate as the electrical "ground"). Furthermore, equations (1) and (2) include phasor representations (i.e., frequency-domain representations) of the signals 250 and 260. From a time-domain perspective, the source signal $U_s$ 250 can be represented by a combined signal:

$$U_s(t) = A_1 \sin(\omega_1 t + \phi_1) + A_2 \sin(\omega_2 t + \phi_2), \quad (10)$$

where $A_1$ and $A_2$ are arbitrary amplitudes, and $\phi_1$ and $\phi_2$ are arbitrary phases. As described above, the source signal $U_s$ 250 can be generated by two oscillators and summed via a non-inverting adder circuit before being applied to the torch component 210 through the reference resistor $R_{ref}$ 252. In an alternative embodiment, the source signal $U_s$ 250 can include a single signal at frequency $\omega_1$ while a separate source signal (not pictured) applied to the torch component 210 can include a single signal at frequency $\omega_2 \neq \omega_1$. In another alternative embodiment, the source signal $U_s$ 250 can periodically vary between supplying a signal at a single frequency $\omega_1$ and a signal at a single frequency $\omega_2 \neq \omega_1$.

In the model diagram 200, the source signal $U_s$ 250 is supplied to the torch component 210, but other configurations can also be used. For example, in an alternative or supplemental embodiment, the source signal $U_s$ 250 can be supplied to the workpiece 220. In yet a further alternative or supplemental embodiment, the reference resistance 252 can more generally be any known reference impedance $Z_{ref}$ (i.e., the reference impedance can include a resistor, capacitor, inductor, or any combination thereof).

Figure 3:
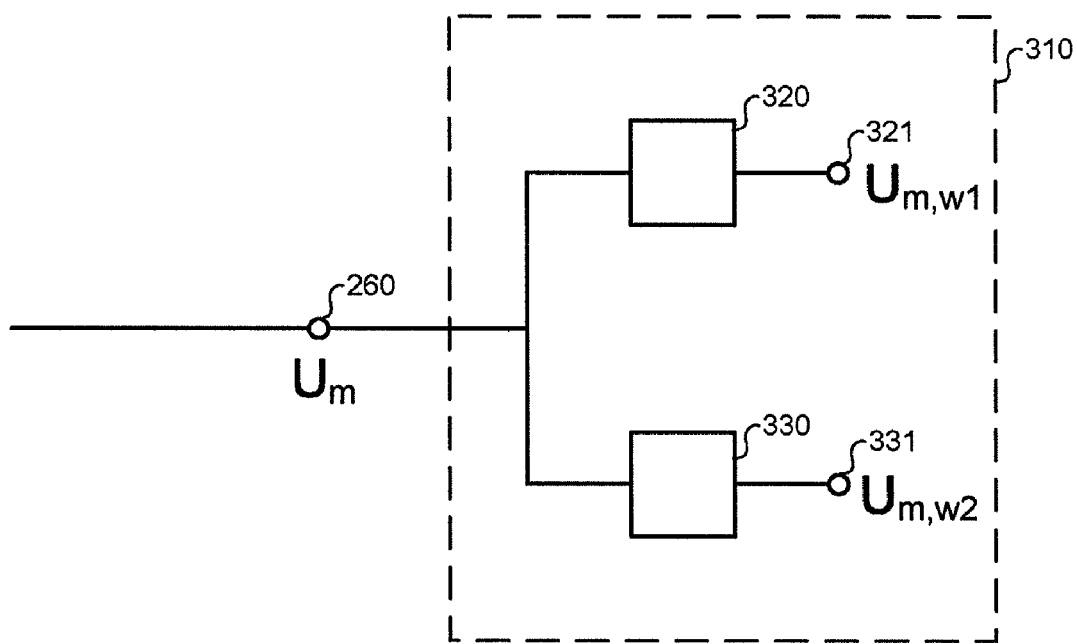
FIG. 3 is a block diagram of a measurement device.

FIG. 3 is a block diagram 300 of a measurement device 310. In the block diagram 300, the measurement device 310 receives and/or senses the measured signal $U_m$ 260 as a combined signal of measurements at two different frequencies, but other configurations can also be used. For example, in an alternative or supplemental embodiment, the measurement device 310 can receive two separate measured signals corresponding to two different frequencies. The measurement device 310 includes a first band-pass filter 320 and a second band-pass filter 330. The band-pass filters 320 and 330 can filter the measured signal $U_m$ 260 at specified frequencies (e.g., $\omega_1$ and $\omega_2$) to determine, respectively, the measurements $U_{m,\omega_1}$ 321 and $U_{m,\omega_2}$ 331 to be used in equations (1)-(9). The second band-pass filter 330 can be a low-pass filter and the first band-pass filter 320 can be a high-pass filter. In a supplemental or alternative embodiment, the first and/or the second band-pass filters 320 and 330 can be a notch filter, which can filter additional noise and/or spurious frequency signals.

Using equation (8), the gap capacitance $C_g$ 242 between the torch component 210 and the workpiece 220 can be determined based on, in part, the measurements $U_{m,\omega_1}$ 321 and $U_{m,\omega_2}$ 331 at two different frequencies. As described above, in one embodiment, the distance 230 can be related to the gap capacitance $C_g$ 242 using a calibrated correlation data set. The calibrated correlated data set can be derived, for example, by measuring the distance 230 between the torch component 210 and the workpiece 220 in the absence of a plasma (i.e., the plasma resistance $R_p$ 244=∞). In this case, equation (3) simplifies to:

$$\|U_{m,\omega}\|_{open} = \frac{|U_{s,\omega}|}{\sqrt{1 + (\omega C_g R_{ref})^2}}, \tag{11}$$

where "open" indicates the absence of a plasma. In the DC case, equation (11) simplifies further to yield:

$$U_{m,DC}|_{open} = U_{s,DC}. \tag{12}$$

In an alternative or supplemental embodiment, the magnitude of the measured signal $U_m$ 250 in the absence of a plasma can be directly related to the distance 230 using a calibrated correlation data set, eliminating the need to directly determine the gap capacitance $C_g$ 242. Specifically, a magnitude of an AC measurement (e.g., $|U_{m,\omega}\|_{open}$) can be used to correlate and/or determine the distance 230. When a plasma forms, however, simply using the magnitude of the measured signal $|U_{m,\omega}|$ would yield an inaccurate distance. To correct for this, a correction term can be determined and added to the magnitude of the measured signal $|U_{m,\omega}|$ as illustrated in equation (13) below:

$$|U_{m,\omega}| + \Delta_{correction} = \text{"effective"}|U_{m,\omega}\|_{open}, \tag{13}$$

where the effective $|U_{m,\omega}\|_{open}$ can then be used in relation to the calibration data set to determine the distance 230. The use of the correction term $\Delta_{correction}$ advantageously eliminates the need to perform additional processing to calculate the unknown gap capacitance $C_g$ 242.

In one embodiment, the correction term $\Delta_{correction}$ can be determined from the perspective of a Taylor series representation of equation (3) where the variable is the inverse of the plasma resistance $R_p$ 244:

$$|U_{m,\omega}|\left(\frac{1}{R_p}\right) = |U_{m,\omega}|\left(\frac{1}{R_p}=0\right) + \frac{1}{R_p}\frac{d}{d\frac{1}{R_p}}\left(|U_{m,\omega}|\left(\frac{1}{R_p}\right)\right)\bigg|_{\frac{1}{R_p}=0} \tag{14}$$

+higher order terms.

From equations (13) and (14), the correction term $\Delta_{correction}$ can be determined to be:

$$\Delta_{correction} = -\frac{1}{R_p}\frac{d}{d\frac{1}{R_p}}\left(|U_{m,\omega}|\left(\frac{1}{R_p}\right)\right)\bigg|_{\frac{1}{R_p}=0} - \text{higher order terms}. \tag{15}$$

Assuming that the higher order terms are negligible (i.e., where $R_p \gg R_{ref}$), and using equation (3), the correction term $\Delta_{correction}$ to first order is:

$$\Delta_{correction} = \frac{R_{ref}}{R_p}\frac{|U_{s,\omega}|}{(1+\omega^2 C_g^2 R_{ref}^2)^{3/2}}. \tag{16}$$

One skilled in the art will appreciate that higher orders can be included as necessary for greater accuracy. Assuming that $\omega^2 C_g^2 R_{ref}^2 \ll 1$, then the correction term $\Delta_{correction}$ can be approximated as being independent of the gap capacitance 242:

$$\Delta_{correction} = |U_{s,\omega}|\frac{R_{ref}}{R_p}. \tag{17}$$

The plasma resistance $R_p$ 244 can be determined using the DC measurements as illustrated in equation (9), where $U_{m/s,DC} \equiv U_{m/s,\omega=0}$, resulting in:

$$\Delta_{correction} = |U_{s,\omega}|\left(\frac{U_{s,DC}}{U_{m,DC}} - 1\right). \tag{18}$$

From equations (13) and (18), the effective $|U_{m,\omega}\|_{open}$, which can be used in relation to the calibration data set to determine the distance 230, is:

$$\text{"effective"}|U_{m,\omega}\|_{open} = |U_{m,\omega}| + |U_{s,\omega}|\left(\frac{U_{s,DC}}{U_{m,DC}} - 1\right), \tag{19}$$

which is a function of the magnitudes of: the measured AC signal $U_{m,\omega}$, the measured DC signal $U_{m,DC}$, and the AC and DC source signals $U_{s,\omega}$ and $U_{s,DC}$.

In an alternative or supplemental embodiment, the correction term $\Delta_{correction}$ can be determined using different approximations from that illustrated above. From equations (3), (11), and (13), the correction term $\Delta_{correction}$ normalized to the AC source magnitude can be represented as:

$$\frac{\Delta_{correction}}{|U_{s,\omega}|} = \frac{1}{\sqrt{1+(\omega C_g R_{ref})^2}} - \frac{1}{\sqrt{\left(1+\frac{R_{ref}}{R_p}\right)^2 + (\omega C_g R_{ref})^2}}, \tag{20}$$

which can be thought of as a "normalized shift in the AC measurement" caused by the presence of a plasma. In general, it is not possible to explicitly separate the influence of the two unknowns in equation (20): the gap capacitance $C_g$ 242 and the plasma resistance $R_p$ 244. However, in certain special cases, such as, for example, when $R_{ref}/R_p$ and/or $\omega C_g R_{ref}$ are small compared to 1, the correction term $\Delta_{correction}$ can become a strong function of $R_{ref}/R_p$ and only weakly dependent upon $\omega C_g R_{ref}$, which can therefore be ignored. The correction to be applied to the measured signal magnitude $|U_{m,\omega}|$ can, in this case, be determined solely in terms of the quantity $R_{ref}/R_p$, or alternatively, in terms of the source and measured DC signal levels from equation (9). Furthermore, the correction term $\Delta_{correction}$ can generally be represented as a polynomial function of the source and measured DC signal magnitudes. A polynomial representation of first or second order can be sufficiently accurate, though higher order functions can also be used.

The DC voltage drop across the reference resistor $R_{ref}$ 252 is $U_{r,DC} = U_{s,DC} - U_{m,DC}$, and a "normalized shift in the DC measurement" caused by the plasma can be represented as:

$$\frac{U_{r,DC}}{U_{s,DC}} = 1 - \frac{U_{m,DC}}{U_{s,DC}}. \quad (21)$$

Note that in the absence of a plasma (i.e., $R_p=\infty$), $U_{m,DC}|_{open}=U_{s,DC}$, so there is no DC shift. From equation (9), where, the normalized shift in the DC measurement can be related to $R_{ref}/R_p$:

$$1 + \frac{R_{ref}}{R_p} = \frac{U_{s,DC}}{U_{m,DC}} = \frac{1}{1 - U_{r,DC}/U_{s,DC}}. \quad (22)$$

Using equation (22), the correction term $\Delta_{correction}$ equation (20) becomes:

$$\frac{\Delta_{correction}}{|U_{s,\omega}|} = \quad (23)$$

$$\frac{1}{\sqrt{1 + (\omega C_g R_{ref})^2}} - \frac{1}{\sqrt{\left(\frac{1}{1 - U_{r,DC}/U_{s,DC}}\right) + (\omega C_g R_{ref})^2}},$$

Figure 4:
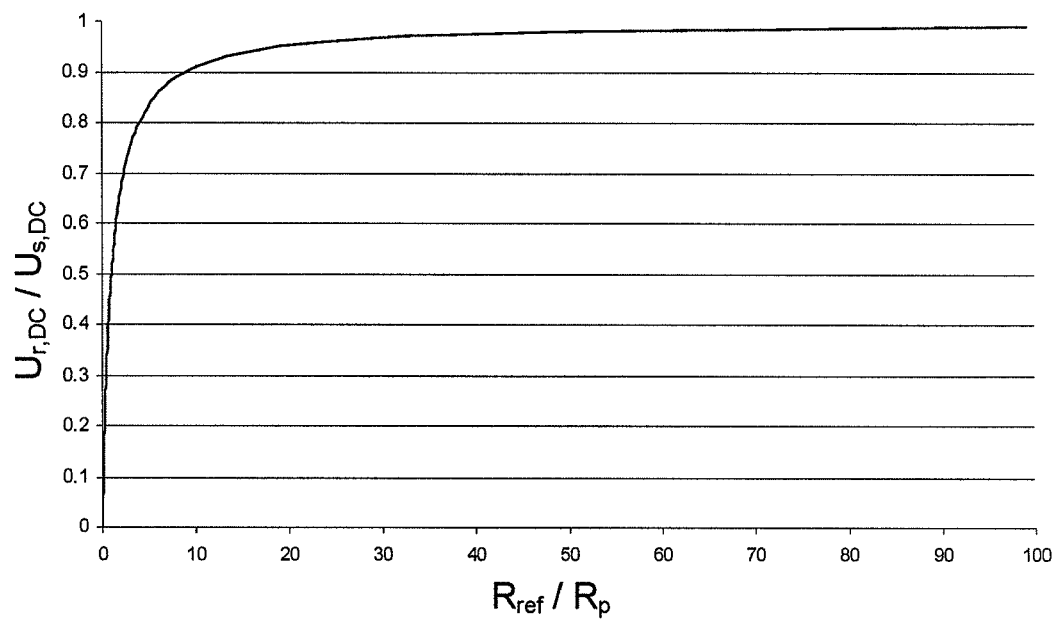
FIG. 4 is a normalized DC shift plot showing the relationship between the resistance ratio $R_{ref}/R_p$ and the normalized DC shift.
Figure 5:
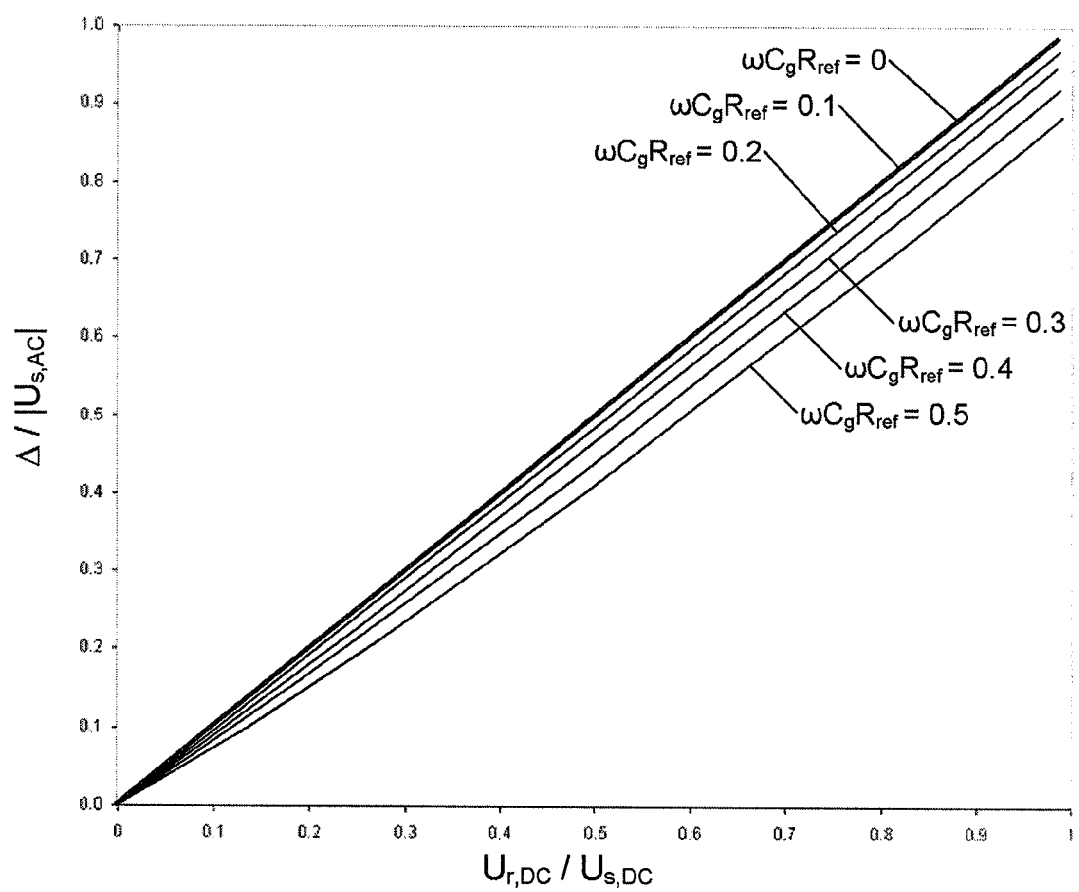
FIG. 5 is a normalized AC shift plot showing the relationship between the normalized correction term $\Delta_{correction}$ and the normalized DC shift.

FIG. 4 illustrates a normalized DC shift plot 400 showing the relationship between the resistance ratio $R_{ref}/R_p$ and the normalized DC shift of equation (21). The plot 400 is a one-to-one mapping from the values (0–∞) for $R_{ref}/R_p$, to (0–1) for the normalized DC shift. FIG. 5 illustrates a normalized AC shift plot 500 showing the relationship between the normalized correction term $\Delta_{correction}$ and the normalized DC shift of equation (21) for different values of $\omega C_g R_{ref}$. The plot 500 illustrates that the exact AC correction term $\Delta_{correction}$ can be determined over the entire range of $U_{r,DC}/U_{s,DC}$ (i.e., $R_{ref}/R_p$), not just for situations where $R_{ref}/R_p \ll 1$. However, an assumption can be made regarding the value of $\omega C_g R_{ref}$, which is unknown. If $\omega C_g R_{ref} \leq 0.3$ (e.g., by choosing appropriate values for the frequency and/or the reference resistor $R_{ref}$ 252), such that $(\omega C_g R_{ref})^2 < 0.1$, plot 500 shows that minimal error can occur if the top four curves of plot 500 are replaced by a single straight line, i.e., $\Delta_{correction}/|U_{s,AC}|=m \cdot U_{r,DC}/U_{s,DC}$, where m can be an adjustable slope. The slope m is 1 for $\omega C_g R_{ref}=0$ and can decrease for larger values of $\omega C_g R_{ref}$. Corrections can be made for even larger values of $\omega C_g R_{ref}$ by decreasing m and optionally adding a quadratic term to the correction.

In the case where the plasma correction is represented by a first order polynomial function of the measured DC shift, a general-purpose operational-amplifier can be used as a gain element and an adder circuit can then add the appropriate correction to the magnitude measurement at the higher frequency. The DC shift itself can be measured by utilizing an instrumentation amplifier, or a difference amplifier. More complex functions can also be used, as described above, which can be implemented, for example, in either an analog form and/or digital form.

Figure 6:
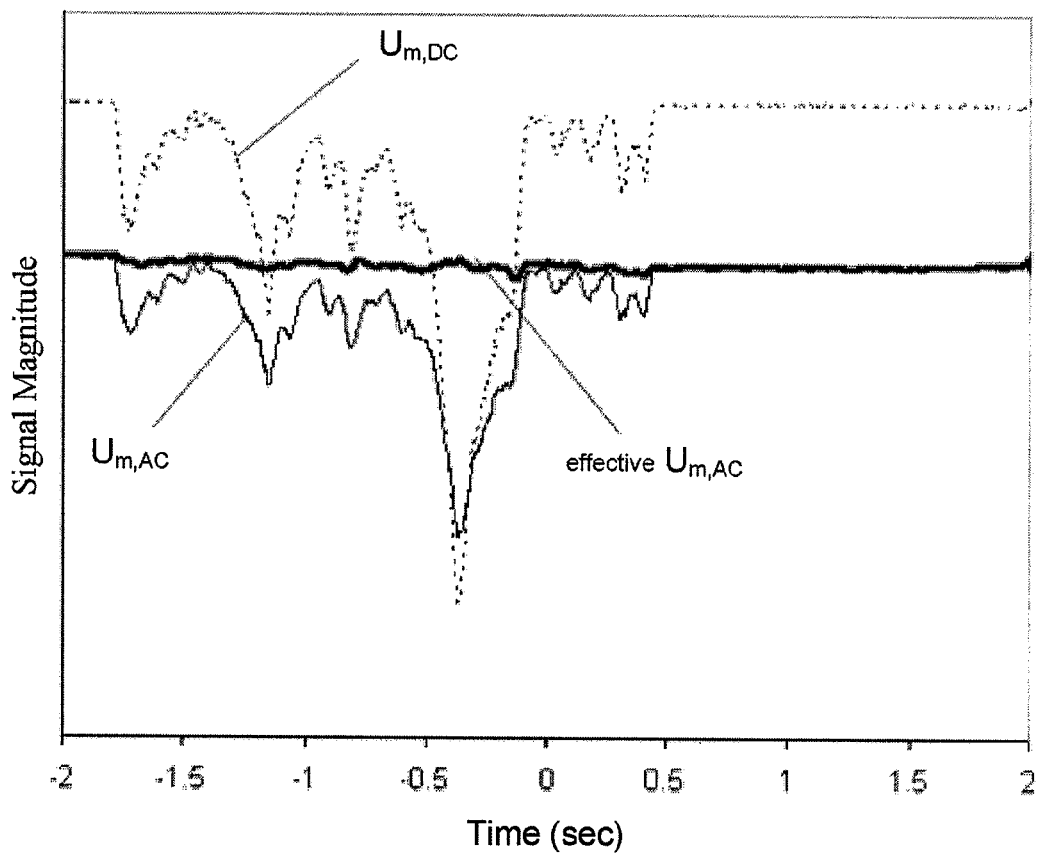
FIG. 6 is a plot showing an example of measured signal magnitudes over time.
Figure 7:
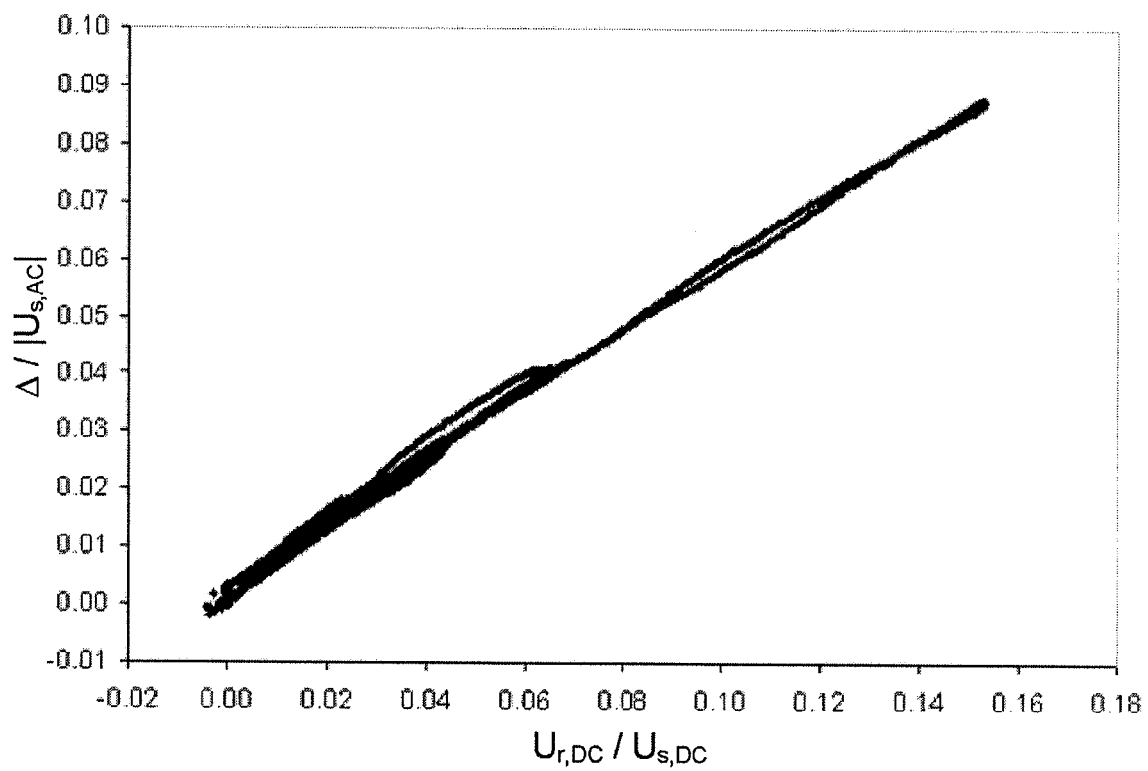
FIG. 7 is a plot showing an example relationship between the normalized correction term $\Delta_{correction}$ and the normalized DC shift.

FIG. 6 is a plot 600 showing an example of measured signal magnitudes over time utilizing the above-described techniques. In this example, the nozzle of a torch component was maintained at a constant distance of about 6 mm from the workpiece. A plasma was formed between approximately −1.8 seconds and 0.5 seconds. Disturbances in both $U_{m,DC}$ and $|U_{m,AC}|$ can be seen to result due to the presence of the plasma. The disturbances are similar, as confirmed in FIG. 7, which is a plot 700 showing the time-traced relationship between the normalized correction term $\Delta_{correction}$ and the normalized DC shift in this example (electronic noise in the data acquisition system as well as minor variations in the gap cause the data points to not completely follow the same trace). The data plotted in 700 shows a substantially linear correlation, with a slope of ~0.57. Therefore, using m=0.57 in the calculation of the AC correction, the corrected AC measurement can be obtained, which is illustrated as the effective $|U_{m,AC}|$ in plot 600. The effective $|U_{m,AC}|$ is substantially constant in plot 600, which confirms that the distance between the nozzle and the workpiece is constant in this example, independent of the presence of the plasma. In this example, $\omega_2$=236 kHz and $R_{ref}$=67 kΩ. Generally, AC frequencies can range from between about 100 kHz to about 700 kHz, but other frequencies below or above this range can also be used. In addition, the reference resistance $R_{ref}$ can range from between about 25 kΩ to about 75 kΩ, but other values below or above this range can also be used. Furthermore, in this example, the capacitance at this distance is about 0.08 pF and the minimum plasma resistance $R_p$ was about 400 kΩ.

Figure 8:
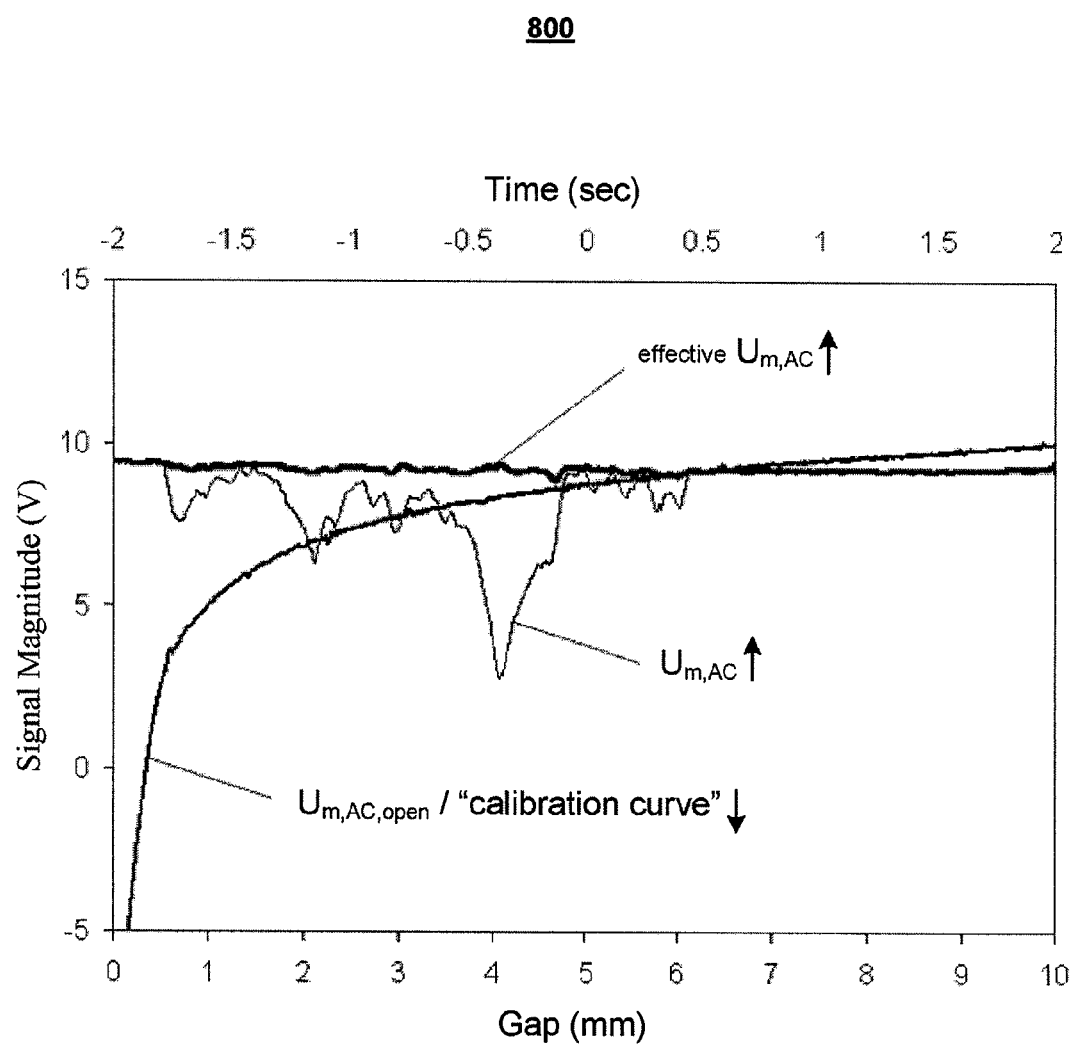
FIG. 8 is a plot showing an example of measured signal magnitudes over time overlaid with a distance calibration curve.

FIG. 8 is a plot 800 showing the measured signal magnitudes of plot 600 overlaid with a distance calibration curve. Plot 800 illustrates the error in distance that can occur by using an uncorrected AC measurement of $|U_{m,AC}|$. At about −0.5 secs, $|U_{m,AC}|$ reaches about 2.5 V, which corresponds to a distance of about 0.5 mm. However, using the corrected $|U_{m,AC}|$ the distance is 6 mm.

In a supplemental or alternative embodiment, the above described techniques can be extended to cases where the plasma cannot be considered to be a purely ohmic resistance. For example, the physical effects between the interface of a plasma region with a non-plasma region can be characterized by the presence of a Debye sheath, which can act primarily as a capacitance. Therefore, the gap impedance $Z_g$ 240 can be modeled more accurately as a gap capacitance $C_g$ 242 in parallel with a plasma impedance $Z_p$, where the plasma impedance $Z_p$, in turn, can be modeled as a plasma resistance $R_p$ in series with a plasma capacitance $C_p$. One skilled in the art will appreciate that the three unknowns ($C_g$, $R_p$, $C_p$) in this model require measurements at three different frequencies (i.e., to obtain three equations) in order to solve for the three unknowns.

Figure 9:
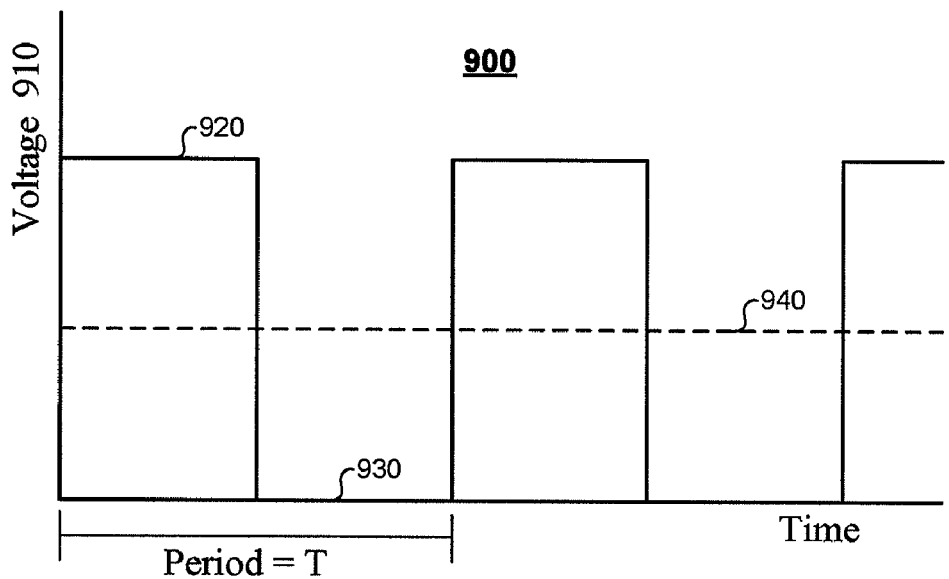
FIG. 9 is a plot showing an example of a generated square wave signal.

In a supplemental or alternative embodiment, the source signal $U_s$ 250 in the above described techniques can be a square wave with a DC offset. In one embodiment, the square wave can be generated using a source that repeatedly switches between two voltage levels (e.g., between zero and a non-zero voltage, or between two different non-zero voltages). The source can be, for example, the "555" timer IC or any other astable multivibrator. FIG. 9 is a plot 900 showing an example of a generated square wave signal 910 with a period T. The signal 910 switches between a high voltage level 920 and a zero voltage level 930. The signal 910 has a DC-offset 940 that is equal to half of the magnitude of the high voltage level 920. In general cases, the DC-offset is equal to the average voltage level (e.g., half the maximum and minimum voltage levels in the case of a square wave). Using Fourier analysis, the square wave 910 can be viewed as including a DC component with magnitude 940, a first harmonic with a period T, and higher order harmonics with periods T/3, T/5, T/7, and so forth. In this manner, the above described techniques can work in a similar manner if the band-pass filters 320 and 330 filter at or around DC and $\omega=2\pi/T$, respectively.

Figure 10:
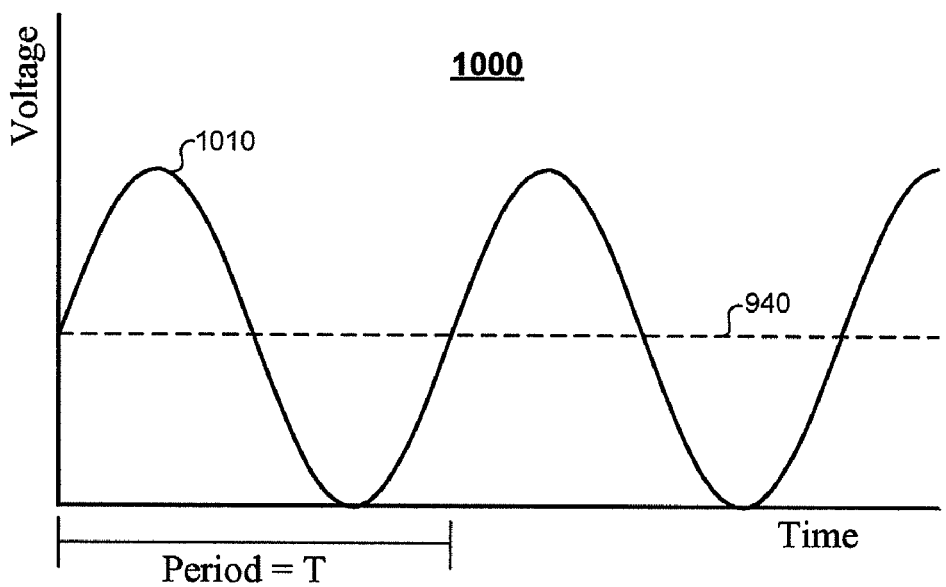
FIG. 10 is a plot showing an example of an ideal low-pass filtered signal.

In a further supplemental or alternative embodiment, the source signal $U_s$ 250 can be any periodic signal (e.g., sine, triangle, sawtooth, etc.) generated by switching between two or more voltage levels and having a non-zero DC offset. A switched-signal generator can be, for example, a digital signal processor adapted to synthesize waveforms. The digital signal processor can be followed by a digital to analog convertor to produce an analog output. In one embodiment, a periodic switch-generated signal with a DC offset and period T can be supplied directly to the torch component 210 or the workpiece 220. In another embodiment, a periodic switch-generated signal with a DC offset and period T can first be passed through a band-pass filter with a cut-off frequency set higher than 1/T but lower than ½T (or ⅓T in the case of a square wave). In this manner, a single sinusoid with a DC offset can be applied directly to the torch component 210 or the workpiece 220. FIG. 10 is a plot 1000 showing an example of an ideal low-pass filtered signal 1010 with a DC offset 940.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and the computer program can be deployed in any form, including as a stand-alone program or as a subroutine, element, or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by, and an apparatus can be implemented as, special purpose logic circuitry, e.g., an FPGA (field programmable gate array) or an ASIC (application-specific integrated circuit). Subroutines can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD, DVD, and HD-DVD disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for determining a distance between a first piece and a second piece, using a processor or an electronic circuit, the method comprising:
   directing a laser beam or a plasma arc onto a first or a second piece;
   generating a source electrical signal by switching between two or more DC voltage levels, the source electrical signal establishing a source DC offset having a value different from zero;
   applying, using the processor or electronic circuit, at one or both of the first and second pieces, the source electrical signal;
   measuring, using the processor or electronic circuit, at one or both of the first and second pieces, a measured electrical signal, the measured electrical signal including a measured DC offset; and
   determining the distance between the first and second piece, based on the measured electrical signal by eliminating a plasma resistance using the measured DC offset and the source DC offset.

2. The method of claim 1, wherein the first piece comprises a torch component and the second piece comprises a workpiece.

3. The method of claim 2, wherein the torch component comprises a laser nozzle.

4. The method of claim 1, wherein determining the distance comprises:
   calculating a gap capacitance between the first piece and the second piece based on the measured electrical signal; and
   determining the distance based on the gap capacitance.

5. The method of claim 4, wherein determining the gap capacitance is based on: a frequency of the electrical signal, a magnitude of the electrical signal, a magnitude of the DC offset, or any combination thereof.

6. The method of claim 4, wherein determining the distance comprises:
using a calibration data set to determine the distance, the calibration data set comprising data values associated with: the frequency of the electrical signal, a magnitude of the electrical signal, a magnitude of the DC offset, or any combination thereof.

7. The method of claim 1, wherein the electrical signal comprises: a current signal or a voltage signal.

8. The method of claim 1, wherein measuring the electrical signal comprises passing the electrical signal through a high pass filter, the high pass filter attenuating the DC offset.

9. The method of claim 8, wherein measuring the electrical signal comprises measuring the DC offset by passing the electrical signal through a low pass filter.

10. The method of claim 1 further comprising determining a plasma resistance between the first piece and the second piece based on the measured electrical signal.

11. The method of claim 1, wherein the source electrical signal comprises: a current source signal or a voltage source signal.

12. The method of claim 1, wherein the source electrical signal is a square wave.

13. The method of claim 1 further comprising passing the source AC signal through a source band-pass filter before applying the source electrical signal to one or both of the first and second pieces, the source band-pass filter including a cut-off frequency above a fundamental frequency of the source electrical signal.

14. The method of claim 1, wherein the step of determining the distance comprises:
using a calibration data set to determine the distance, the calibration data set comprising data values associated with: a frequency of the electrical signal, a magnitude of the electrical signal, a magnitude of the DC offset, a magnitude of the source electrical signal, a magnitude of the source DC offset, or any combination thereof.

15. The method of claim 1, wherein measuring the electrical signal comprises measuring the electrical signal at a position after a known electrical element, the known electrical element being located between the position and a source of the source electrical signal.

16. A system for determining a distance between a first piece and a second piece, the system comprising:
a switched-signal generator that generates a source electrical signal by switching between two or more DC voltage levels, the source electrical signal establishing a source DC offset having a value different from zero;
a source that applies, at one or both of the first and second pieces, the source electrical signal;
a measuring device that measures, at one or both of the first and second pieces, a measured electrical signal, the measured electrical signal including a measured DC offset; and
a signal processing device that determines the distance between the first and second pieces, based on the measured electrical signal and the source electrical signal by eliminating a plasma resistance using the measured DC offset and the source DC offset.

17. The system of claim 16, wherein the first piece comprises a torch component and the second piece comprises a workpiece.

18. The system of claim 16 further comprising:
a high pass filter that attenuates the DC offset; and
a low pass filter that passes the DC offset.

19. The system of claim 16, wherein the switched-signal generator comprises a switch coupled to two voltage levels.

20. The system of claim 16 further comprising a source band-pass filter that passes the source signal from the switched-signal generator to the source, the source band-pass filter including a cut-off frequency above a fundamental frequency of the source electrical signal.

21. The system of claim 16, wherein the measuring device measures the electrical signal at a position of a known electrical element, the known electrical element being located between the position and the source.

22. A system for performing a capacitive distance measurement between a first piece and a second piece, the system comprising:
signal generator means for generating a source electrical signal by switching between two or more DC voltage levels, the source electrical signal establishing a source DC offset having a value different from zero;
source means for applying, at one or both of the first and second pieces, the source electrical signal;
measuring means for measuring, at one or both of the first and second pieces, a measured electrical signal, the electrical signal including a measured DC offset;
signal processing means for determining the distance between the first and second pieces, based on the measured electrical signal by eliminating a plasma resistance using the measured DC offset and the source DC offset.

23. The system of claim 22, wherein the first piece comprises a torch component and the second piece comprises a workpiece.

24. The system of claim 22 further comprising:
high-pass filtering means for attenuating the DC offset; and
low-pass filtering means for passing the DC offset.

25. An apparatus for determining a distance between a first piece and a second piece, the apparatus comprising a processor or electronic circuit that performs the method steps:
directing a laser beam or a plasma arc onto a first or a second piece;
generating a source electrical signal by switching between two or more DC voltage levels, the source electrical signal establishing a source DC offset having a value different from zero;
applying, using the processor or electronic circuit, at one or both of the first and second pieces, the source electrical signal;
measuring, using the processor or electronic circuit, at one or both of the first and second pieces, a measured electrical signal, the measured electrical signal including a measured DC offset; and
determining the distance between the first and second piece, based on the measured electrical signal by eliminating a plasma resistance using the measured DC offset and the source DC offset;
the apparatus further comprising a computing system including a back-end component, a middleware component, or a front-end component.

* * * * *